(12) United States Patent
Vettese

(10) Patent No.: US 7,985,052 B2
(45) Date of Patent: Jul. 26, 2011

(54) CURVED BLADE FOR WIND TURBINES

(75) Inventor: Sharolyn Vettese, North York (CA)

(73) Assignee: Wind Simplicity Inc., North York, Ontario (CA)

( * ) Notice: Subject to any disclaimer, the term of this patent is extended or adjusted under 35 U.S.C. 154(b) by 914 days.

(21) Appl. No.: 11/874,508

(22) Filed: Oct. 18, 2007

(65) Prior Publication Data

US 2009/0104039 A1     Apr. 23, 2009

(51) Int. Cl.
*F03D 11/02*     (2006.01)
(52) U.S. Cl. ............ 416/223 R; 416/210 R; 416/228; 416/242; 416/244 R
(58) Field of Classification Search .......... 416/205, 416/210 R, 223 R, 228, 235, 238, 242, 243, 416/244 R, DIG. 4
See application file for complete search history.

(56) References Cited

U.S. PATENT DOCUMENTS

| 1,953,417 | A | * | 4/1934 | Lindberg | 416/238 |
| 2,023,111 | A | * | 12/1935 | Alsing | 416/144 |
| 2,079,942 | A | * | 5/1937 | Le Velle | 416/87 |
| 2,167,050 | A | * | 7/1939 | Mohler | 416/153 |
| 2,269,287 | A | * | 1/1942 | Roberts | 416/238 |
| 3,331,444 | A | * | 7/1967 | Toner | 416/245 R |
| 5,254,876 | A | * | 10/1993 | Hickey | 290/55 |
| D352,552 | S | * | 11/1994 | Oyama et al. | D23/377 |
| 6,719,533 | B2 | * | 4/2004 | Bird | 416/210 R |
| 7,153,100 | B2 | * | 12/2006 | Frampton et al. | 416/5 |

FOREIGN PATENT DOCUMENTS

| CA | 2477595 | 2/2006 |
| CA | 2481341 | 4/2006 |

* cited by examiner

*Primary Examiner* — Igor Kershteyn
(74) *Attorney, Agent, or Firm* — Shoemaker and Mattare

(57) ABSTRACT

A curved blade for use on horizontal wind turbines, the blade comprising a substantially semicircular tip portion, a substantially semicircular counter-tip portion opposite the tip portion, and a body portion extending between the tip portion and the counter-tip portion, the body portion being further defined by a concave curved trailing edge and a convex curved leading edge.

23 Claims, 5 Drawing Sheets

CURVED BLADE FOR WIND TURBINES

FIELD OF THE INVENTION

The present invention generally pertains to horizontal wind turbines, and in particular to a blade suitable for use on wind turbines in which the blade comprises a concave curved trailing edge and a convex curved leading edge.

BACKGROUND OF THE INVENTION

Wind is a powerful renewable energy source that civilizations have harnessed to varying degrees for several thousand years. Historians accredit ancient Mesopotamia and Egypt as giving rise to sail-based propulsion systems for boats, while most accounts accredit ancient Persia as having developed and implemented windmills in 500 to 900 AD. In around 1390, the Dutch began to refine the windmill, eventually implementing thousands for various applications such as irrigation, land drainage, grain-grinding, saw-milling and the processing of commodities.

With the current awareness of global warming and the human impact upon the environment, there is an increasing shift towards greener, ecologically-friendly technologies. While fossil fuel-fired and nuclear power plants have been standard methods of power generation for the last century, alternative methods for power generation, particularly from renewable energy sources such as the sun and wind have been attracting increasing attention from industry, governments and the general public.

Modern windmills for power generation, or wind turbines, are growing in popularity, with wind farms being established in many countries around the world. Modern windmills come in a variety of sizes and configurations, but many people associate them with the large horizontal wind turbines used for large scale energy generation. These large turbines can stand as tall as 90 meters, with generally three equidistantly spaced blades measuring upwards of 30 meters each.

At the same time, there is growing interest for smaller turbine units that are 3 kW to 99 kW that are better suited to farm and residential application. Unfortunately, these smaller units are subject to less than optimal wind characteristics as they are generally located on lower towers for aesthetic, economic, and practical reasons. As such, there is a need for smaller turbine units having wind capturing characteristics that are suited for the conditions under which these smaller turbine units are operated.

SUMMARY OF THE INVENTION

According to an aspect of an embodiment, provided is a curved blade for use on horizontal wind turbines, the blade comprising a substantially semicircular tip portion; a substantially semicircular counter-tip portion opposite the tip portion; and a body portion extending between the tip portion and the counter-tip portion, the body portion being further defined by a concave curved trailing edge and a convex curved leading edge.

According to a further aspect of an embodiment, provided is a curved blade for use in a blade rotor assembly, said blade comprising a substantially semicircular tip portion; a substantially semicircular counter-tip portion opposite the tip portion; and a body portion extending between the tip portion and the counter-tip portion, the body portion being further defined by a concave curved trailing edge and a convex curved leading edge.

BRIEF DESCRIPTION OF THE DRAWINGS

Embodiments of the present application will now be described, by way of example only, with reference to the attached Figures, wherein.

DESCRIPTION OF THE PREFERRED EMBODIMENTS

The curved blade having a curved convex leading edge and a curved concave trailing edge described below is suitable for use on a wide range of horizontal wind turbines, such as the horizontal dual-rotor wind turbine described in applicants co-pending U.S. application "ROTOR DRUM" filed Apr. 13, 2007, which is herein incorporated by reference.

Figure 1:
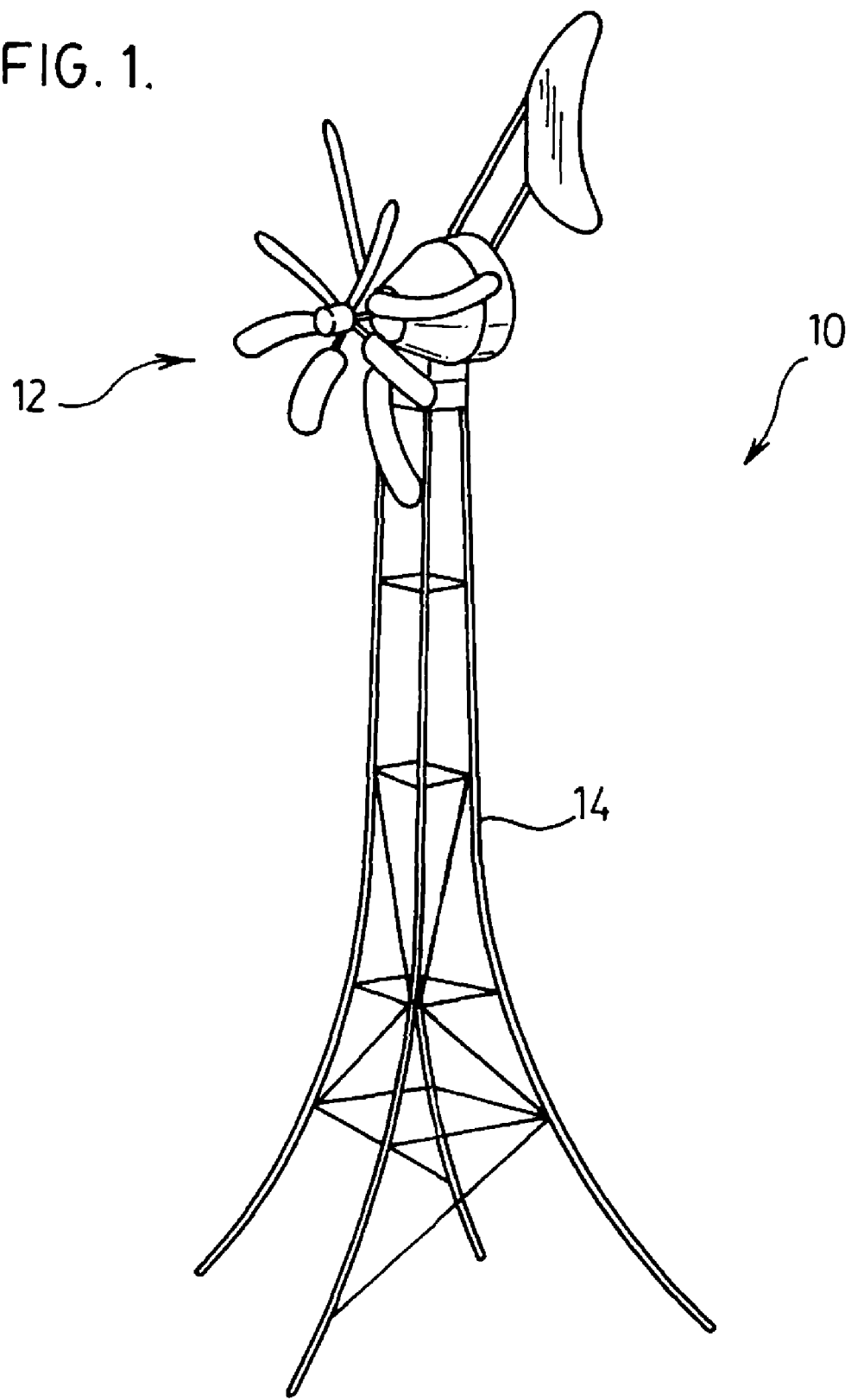
FIG. 1 is a front perspective view of an embodiment showing a complete wind turbine.

Referring now to FIG. 1, shown for exemplary purpose is a horizontal dual-rotor wind turbine, indicated by reference numeral 10. The dual rotor wind turbine 10 generally comprises a wind assembly 12 rotatably mounted on a tower 14.

Figure 2:
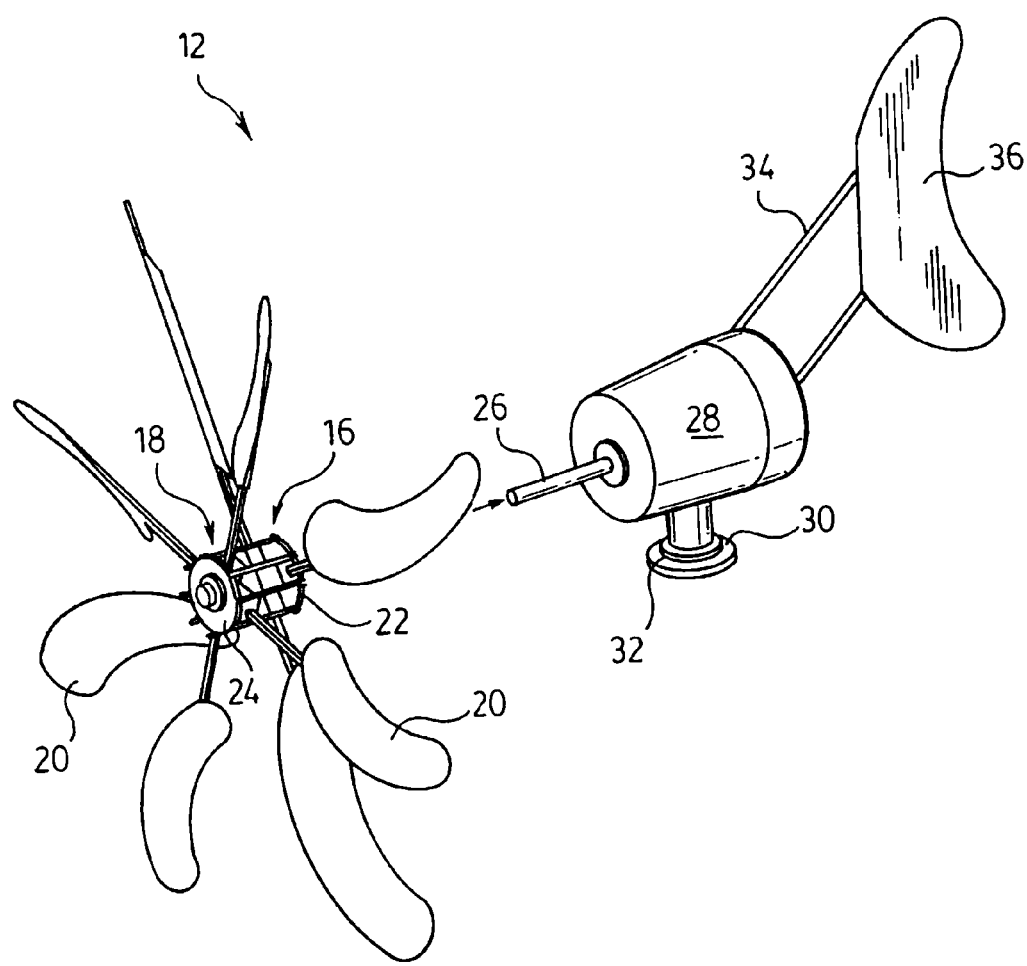
FIG. 2 is a perspective view of the wind assembly of the embodiment shown in FIG. 1.

The wind assembly 12 generally comprises a rotor assembly having arranged thereon a plurality of a equidistantly spaced-apart blades. In the example shown in FIG. 2, a dual rotor assembly is provided comprising a primary rotor assembly 16 and an auxiliary rotor assembly 18, each rotor assembly having mounted thereon a plurality of blades 20, the blades being circumferentially equidistantly spaced on respective rotors 22, 24. As shown, both the primary rotor assembly 16 and the auxiliary rotor assembly 18 comprise four blades each, and both assemblies work cooperatively to rotate a common generator shaft 26 from a generator 28 affixed to a rotatable tower hub 30 (generator shown detached from rotor assemblies for clarity). To enable the wind assembly 12 to rotate relative to the tower 14, and in particular towards the incurrent air (upwind orientation), the tower hub 30 is provided with a rotatable yaw bearing surface 32. Rotation of the wind assembly 12 about tower hub 30 is facilitated by a tail assembly mounted downwind of the wind assembly, the tail assembly generally comprising a tail boom 34 and vane 36.

Figure 3A:
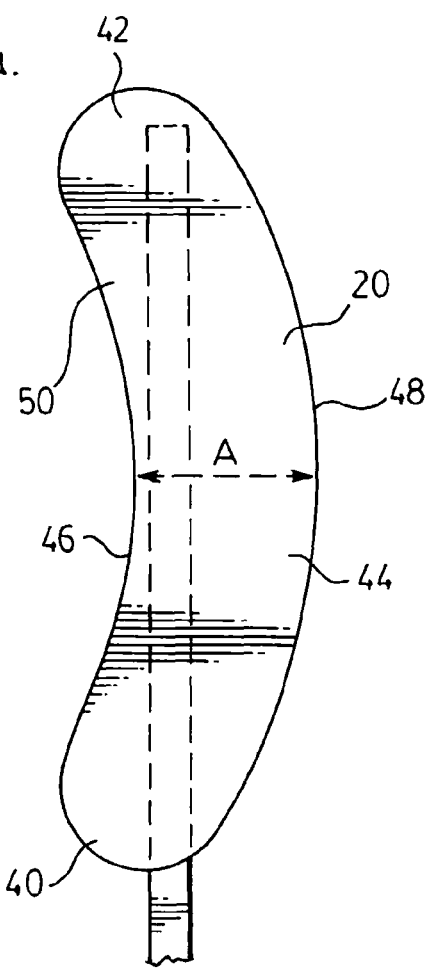
FIG. 3a is a front view of a wind turbine blade according to a first embodiment, wherein the chord is constant throughout the body portion.
Figure 4:
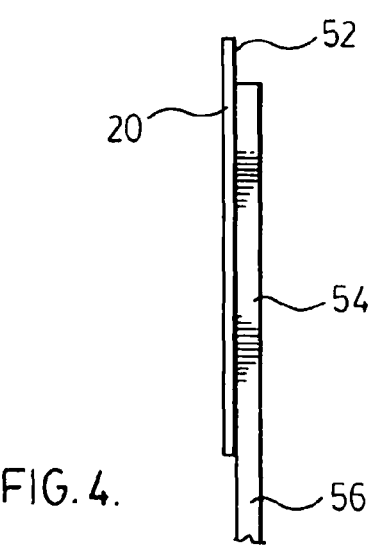
FIG. 4 is a side view of the wind turbine blade, shown mounted on a stem.

As shown in FIGS. 3a and 4, the blade 20 is generally planar and comprises a curved configuration. Each blade 20 comprises a tip portion 42 at the distal end of the blade, and a counter-tip portion 40 closest the rotor, defining an opposite end of the tip portion 42. A body portion 44 extends between the tip portion 42 and the counter-tip portion 40, defining a concave curved trailing edge 46 and a convex curved leading edge 48. As such, for the purposes of the following description, the blade is generally referred to as a convex/concave curved blade 20. Overall, the convex/concave curved blade 20 further defines a windward side 50 upon which the incurrent air exerts a force, and a leeward side 52 opposite the windward side 50, upon which suitable mounting hardware is located, as shown in FIG. 4, and described below. As shown, the counter-tip portion 40 and tip portion 42 are rounded, generally defining a semicircular configuration that connects the convex curved leading edge 48 to the concave curved trailing edge 46.

Figure 3B:
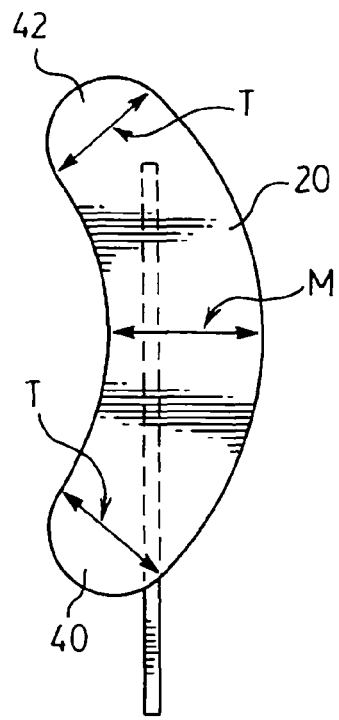
FIG. 3b is a front view of a wind turbine blade according to a second embodiment wherein maximum chord occurs at a intermediate region between the tip and counter-tip portions.

In a preferred embodiment, the chord (A) of each convex/concave curved blade 20, defined as the distance from the leading edge 48 to the trailing edge 46, is substantially constant through the body portion 44, thereby defining a constant-chord configuration. Alternatively, as shown in FIG. 3b, the convex/concave curved blade 20 may be configured with a maximum chord at a midpoint M between the counter-tip portion 40 and the tip portion 42, with the chord decreasing towards each of the counter-tip 40 and tip portions 42, the chord at each of the counter-tip 40 and tip portions 42 being identified as point T. Preferably, the decrease in chord is symmetrical on either side of the midpoint, towards each of the counter-tip and tip portions.

In one embodiment, for a convex/concave curved blade 20 having a maximal chord at a midpoint M, the differential in chord at midpoint M and the tip and counter-tip portions (identified as point T) is approximately 0 to approximately 10% relative to the overall length of the convex/concave curved blade 20. In further embodiments, the differential range is at least one of approximately 1% to approximately 8%, approximately 1.5% to approximately 6%, and approximately 2% to approximately 4%. In a preferred embodiment, the differential range is approximately 2.5% to approximately 3.5%, as presented in Table I. As will be appreciated, the dimensions provided in Table I are merely exemplary, and should not be interpreted or used to dimensionally limit the convex/concave curved blade described herein. One may implement convex/concave curved blades having dimensions that are larger or smaller than those mentioned in Table I. One may also implement convex/concave curved blades that comprise a chord differential that falls outside the above-noted ranges, depending on the implementation.

TABLE I

Sample dimensions for convex/concave curved blade.

| Overall Length[a] | Chord at point T[b] | Chord at point M[c] | Differential[d] |
|---|---|---|---|
| 50 | 10.5 | 12 | 3% |
| 37 | 7.875 | 8.875 | 2.7% |
| 32 | 7 | 8 | 3.1% |

Note:
[a]Length from tip to counter-tip
[b]measurement at T; see FIG. 3b
[c]measurement at M; see FIG. 3b
[d]differential = (chord at point M − chord at point T)/overall length × 100

With the above-noted blade configuration, the surface area of the convex/concave curved blade 20 is increased relative to comparable tapered blades normally found on conventional wind turbines. The increased surface area increases the overall torque produced by the convex/concave curved blade 20, with increased contribution of torque from the tip portion 42 and midpoint region of the body portion 44, as compared to conventional tapered blades. In other words, for any given blade length, the above-noted convex/concave curved blade exhibits a greater overall surface area and resulting torque compared to a similarly dimensioned tapered blade. As such, the convex/concave curved blade described here is well suited for use on smaller-sized wind turbines, in particular on turbines comprising multiple rotors, each of which are fitted with a plurality of convex/concave curved blades.

As shown in FIGS. 3a and 3b, the counter-tip 40 and tip 42 portions, as well as the leading 48 and trailing 46 edges are curved, thereby eliminating corners and angular transitions along the circumference of the blade. During operation, it was been found that the convex/concave curved blade exhibits reduced noise characteristics when used under normal operating conditions. The noted reduction in the overall noise is particularly important when the unit is located in close proximity to a residential setting.

As mentioned previously, and as shown in FIG. 4, the convex/concave curved blade is generally planar. The convex/concave curved blade is preferably made of any suitable metal, for example but not limited to aluminium and stainless steel. The convex/concave curved blade may be manufactured from metal plate having a thickness in the range of about ⅛ inch to about ¾ inch, but smaller or larger dimensioned materials may also be used, depending on the implementation. In a preferred embodiment, the blades are formed of ⅛ inch aluminium plate. The convex/concave curved blade may also be made of any suitable polymeric or fibreglass material. For example, the blades could be manufactured of glass fibre reinforced plastic. Carbon fibre or Kevlar may also be used as reinforcement materials. The simple and straightforward design of the blades makes them economical to produce using a range of production technologies such as, but not limited to stamping, moulding, protrusion and extrusion, as deemed appropriate for the material being used.

Figure 5A:
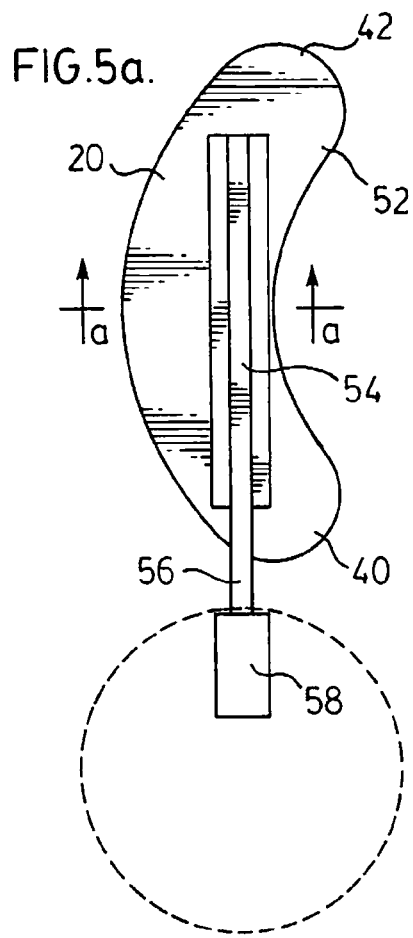
FIG. 5a is a rear view of the wind turbine blade, schematically shown mounted on a rotor.
Figure 6:
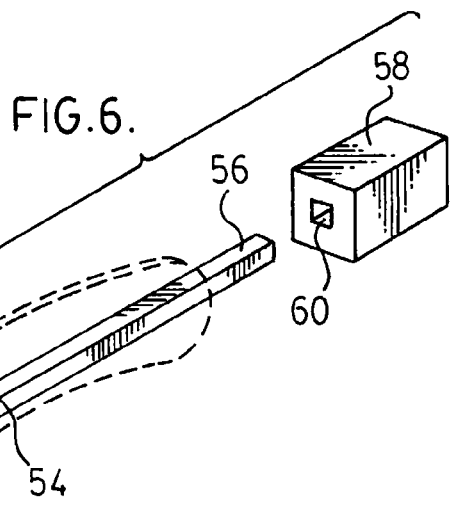
FIG. 6 is a perspective view of a first stem/mounting block arrangement for mounting the wind turbine blade to a rotor.
Figure 7:
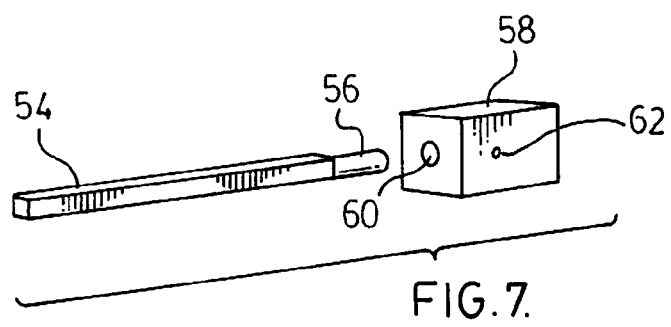
FIG. 7 is a perspective view of an alternate stem/mounting block arrangement for mounting the wind turbine blade to a rotor.

As shown in FIG. 5a, the leeward side 52 of the convex/concave curved blade 20 is supported by a suitable stem 54 that generally spans the convex/concave curved blade 20 from the tip portion 42 through to the counter-tip portion 40. The stem 54 is affixed to the convex/concave curved blade 20 using suitable rivets, but other fastening systems including, but not limited to threaded fasteners and welds are also possible. An extension portion 56 of the stem 54 extends past the counter-tip portion 40 so as to fixedly engage the respective rotor. The extension portion exposes the stem and creates a space between the counter-tip of the blade and the rotor drum, allowing the wind to flow unimpeded over the body of the wind turbine. The space can be lengthened or shortened, as required, by using a stem having a longer or shorter extension portion 56. In general, the convex/concave curved blade 20 is mounted such that the longitudinal axis of the stem perpendicularly intersects the chord at the midpoint of the body portion. As shown, the extension portion 56 is received by a corresponding mounting block 58 on the rotor, and is fixed in position using at least one suitable fastener (e.g. bolts, hex bolts, etc.). A variety of configurations for the stem and corresponding mounting block are possible. For example, as shown in FIG. 6, the stem 54, and in particular the extension portion 56 may comprise a square cross section, wherein the extension portion 56 is received by a mounting block 58 having a similarly configured receptacle 60. In such an embodiment, blade pitch is fixed relative to the mounting block. Blade pitch variations may be achieved by using alternate mounting blocks having preset receptacle orientations. Alternatively, the mounting block itself may be adjustable relative to the rotor, so as accommodate a range of desired blade pitches. In an alternate embodiment shown in FIG. 7, the extension portion 56 of the rectangular stem 54 is circular in cross-section, the extension portion being received in a corresponding mounting block 58 having a similarly configured circular receptacle 60. With a circular configuration, to achieve a particular blade pitch, the extension portion 56 is rotated within the mounting block receptacle 60 and subsequently locked in place using at least one suitable fastener 62. For example, the extension portion 56 may be locked in a desired pitch configuration using threaded fasteners (bolts, hex bolts, etc.) that engage the extension portion 56 at one or more intermediate positions along the axis defined by the mounting block receptacle 60. Alternate means to maintain the extension portion 56 fixed in the mounting block 58 may be implemented, as will be apparent to one skilled in the art.

Figure 5B:
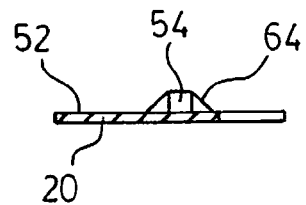
FIG. 5b is a sectional view of the wind turbine blade of FIG. 5a, shown though section a-a.

To improve the overall characteristics of the convex/concave curved blade 20, the stem 54 on the leeward side 52 of the convex/concave curved blade 20 is preferably covered by a housing 64. In particular, it is preferred that the housing is a tapered housing that directs the wind over the stem. An example of the stem housing is shown in FIG. 5b.

The pitch of a mounted blade will generally be in the region of 30° to 45°, but angles above or below this range may be useful for certain operating conditions.

In a further embodiment, the convex/concave curved blade and stem may be integral, wherein the stem is formed into the convex/concave curved blade, particularly upon the leeward side. This is particularly suitable for blades made of a suitable metal, wherein the corresponding stem and extension portion are dimensioned to have sufficient strength to withstand the stresses experienced by these components during normal operation use.

Figures 8A, 8B:
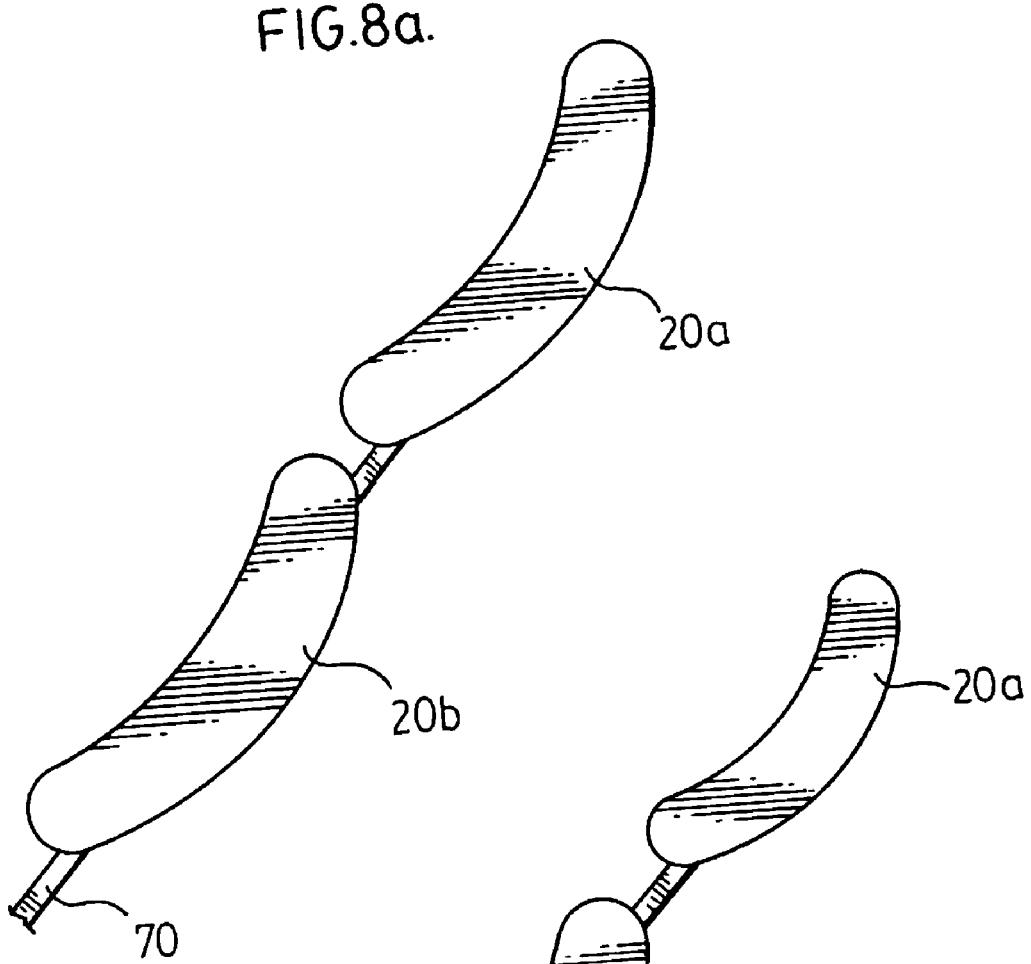
FIG. 8a is a front view of an alternate wind turbine blade arrangement on a stem, wherein the blades are of substantially the same dimension.
FIG. 8b is a front view of a further alternate wind turbine blade arrangement on a stem, wherein the distal blade is smaller than the proximal blade.

As shown in the examples above, in an assembled and operational state, each stem 54 located about a rotor is provided with a single convex/concave curved blade 20. In an alternate embodiment, it is possible to place a plurality of convex/concave curved blades on each support beam, for example as shown in FIGS. 8a and 8b. On any one stem 70, the convex/concave curved blades 20 may be adjusted to the same or different pitches, thereby enabling the wind turbine to be tuned to more than one optimal wind velocity. For example, on any one stem, the distal blade 20a may have a pitch that operates more efficiently during low velocity winds, while the proximal blade 20b may have a pitch that operates more efficiently during higher velocity winds. Alternatively, the convex/concave curved blades may be tuned to have the same pitch, thereby optimizing operation at one predetermined wind velocity. In addition, in any implementation where a plurality of convex/concave curved blades is being used on a single stem, the blades may or may not be of equal dimension. For example, while the distal and proximal blades may be equally dimensioned, it may be advantageous to use smaller distal blades and larger proximal blades, as shown in FIG. 8b, or visa versa. In addition, the spacing between the distal blades and the proximal blades may be adjustable. For example, in one implementation, the spacing may be minimal, with the tip portion of the proximal blade being immediate adjacent the counter-tip portion of the distal blade. Alternatively, the spacing may be increased as deemed appropriate for a particular implementation. In further embodiments, it may be useful to place the convex/concave curved blade 20 in closer or further proximity from the rotor assembly by using a shorter or longer extension portion 56, respectively.

While described and shown as generally planer, the convex/concave curved blade may be configured with a slight twist as deemed necessary for a particular implementation. For instance, the ends of the tip 42 and counter-tip 40 can be curved towards the wind to retain more energy from the wind. Further, while the leading and trailing edges are shown as comprising a continuous curve, one of both of these edges may be shaped. For example, one or both of the trailing/leading edges may be configured with a wave pattern, castellated, pleated or configured with any other shape deemed suitable for a particular implementation. In addition, one or both of the windward and leeward sides of the convex/concave curved blade may be textured. For example, one or both of the windward and leeward sides of the convex/concave curved blade may be provided with dimples, protrusions, ribs or any other texture affecting the wind dynamics of the blade.

The convex/concave curved blade described here is suitable for use on low output (3 to 99 kWh) up-wind or down-wind wind turbines, as well as variations thereof, including both up-wind and down-wind configurations. A typical use will have a plurality of blades arranged in balanced fashion about a centralized hub or rotor assembly. For example, the blades could be used on rotor assemblies comprising 2 or more blades (e.g. rotor assemblies comprising 6, 8 or 10 blades). The blades may also be used with rotor assemblies comprising multiple rotors, such as the horizontal dual-rotor wind turbine described in applicants co-pending U.S. application "ROTOR DRUM" filed Apr. 13, 2007, which is herein incorporated by reference. The increased surface area of the convex/concave curved blade is well suited for use on low output turbines where limited wind velocity is often encountered. The increased surface area of the blades also permit the overall diameter of a blade assembly to be decreased, permitting the use of a lower tower assembly. The convex/concave curved blade may also be used to retrofit the old Dutch windmills, or modern wind turbines of higher output (100 kWh to 750 kWh, or more).

The convex/concave curved blade discussed above may find suitable use in blade rotor assemblies of a range of other applications, such as for use in a propeller assembly for aircraft. The curved blade configuration may also be used with fans and the like, such as those installed as ceiling fans in industrial, commercial and residential settings.

It will be appreciated that, although embodiments of the convex/concave curved blade have been described and illustrated in detail, various modifications and changes may be made. While one embodiment is described above, some of the features described above can be modified, lengthened, shortened, widened, narrowed, replaced or even omitted. Still further alternatives and modifications may occur to those skilled in the art. All such alternatives and modifications are believed to be within the scope of the invention.

The invention claimed is:

1. A curved blade for use on horizontal wind turbines, said blade comprising:
  a substantially semicircular tip portion;
  a substantially semicircular counter-tip portion opposite said tip portion;
  a body portion extending between said tip portion and said counter-tip portion, said body portion being further defined by a concave curved trailing edge and a convex curved leading edge and
  a stem coupled to said body portion, for attachment to a respective mounting block located on a rotor of the wind turbine, wherein the stem intersects a chord of the body portion at a midpoint of the body portion.

2. The curved blade according to claim 1, wherein the chord is constant throughout the body portion of the curved blade.

3. The curved blade according to claim 1, wherein a maximum chord is located in a midpoint region of the body portion, and decreases in dimension towards each of said tip portion and said counter-tip portion.

4. The curved blade according to claim 3, wherein the decrease in chord is symmetrical on either side of the midpoint, in the direction of the tip portion and the counter-tip portion of said curved blade.

5. The curved blade according to claim 1, wherein the longitudinal axis of the stem perpendicularly intersects the chord of the blade at a midpoint of the body portion.

6. The curved blade according to claim 1, wherein the blade is substantially planar.

7. The curved blade according to claim 1, wherein the blade is planar and constructed of aluminum plate having a thickness in the range of about ⅛ inch to about ¾ inch.

8. The curved blade according to claim 1, wherein said stem is covered by a housing that tapers towards each of the leading and trailing edges of the body portion.

9. The curved blade according to claim 1, wherein said blade is suitable for use at pitch angles ranging from 35 to 45°.

10. A curved blade for use in a blade rotor assembly, said blade comprising:
   a substantially semicircular tip portion;
   a substantially semicircular counter-tip portion opposite said tip portion;
   a body portion extending between said tip portion and said counter-tip portion, said body portion being further defined by a concave curved trailing edge and a convex curved leading edge and
   a stem coupled to said body portion, for attachment to a respective mounting block located on a rotor of the wind turbine, wherein the stem intersects a chord of the body portion at a midpoint of the body portion.

11. The curved blade according to claim 10, wherein the chord is constant throughout the body portion of the curved blade.

12. The curved blade according to claim 10, wherein a maximum chord is located in a midpoint region of the body portion, and decreases in dimension towards each of said tip portion and said counter-tip portion.

13. The curved blade according to claim 12, wherein the decrease in chord is symmetrical on either side of the midpoint, in the direction of the tip portion and the counter-tip portion of said curved blade.

14. The curved blade according to claim 10, wherein the longitudinal axis of the stem perpendicularly intersects the chord of the blade at a midpoint of the body portion.

15. The curved blade according to claim 10, wherein the blade is substantially planar.

16. The curved blade according to claim 10, wherein the blade is planar and constructed of aluminum plate having a thickness in the range of about ⅛ inch to about ¾ inch.

17. The curved blade according to claim 10, wherein said stem is covered by a housing that tapers towards each of the leading and trailing edges of the body portion.

18. The curved blade according to claim 10, wherein said blade is suitable for use at pitch angles ranging from 30 to 45°.

19. The curved blade according to claim 10, wherein the blade is planar and constructed of aluminum plate having a thickness of less than ⅛ inch.

20. The curved blade according to claim 10, wherein the blade is constructed of a material comprising plastic.

21. The curved blade according to claim 20, wherein the material is glass fibre reinforced plastic.

22. The curved blade of claim 10, wherein the pitch angle of the blade is less than 35°.

23. A system, comprising:
   a plurality of blades, each blade comprising:
   a substantially semicircular tip portion;
   a substantially semicircular counter-tip portion opposite said tip portion; and
   a body portion extending between said tip portion and said counter-tip portion, said body portion being further defined by a concave curved trailing edge and a convex curved leading edge; and
   a stem coupled to said body portion of each of said plurality of blades, for attachment to a respective mounting block located on a rotor of a blade rotor assembly, wherein the stem intersects a chord of the body portion of each of said plurality of blades at a midpoint of the body portion.

* * * * *